April 8, 1952     R. P. TAYLOR ET AL     2,592,078
EDUCATIONAL FIGURE TOY DEVICE
Filed March 24, 1948
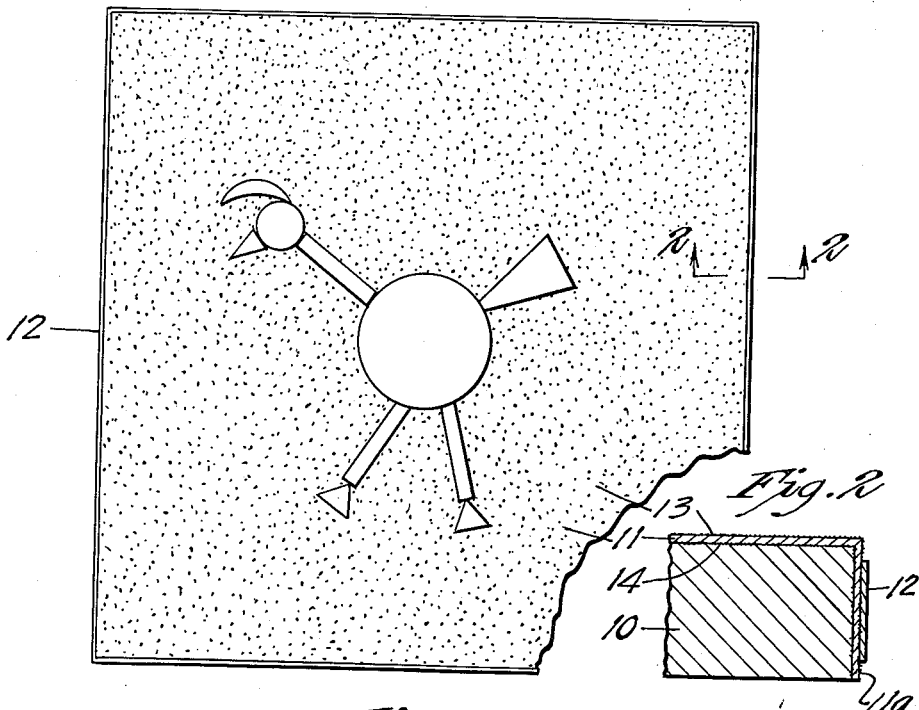
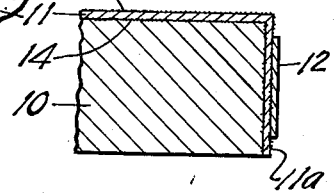
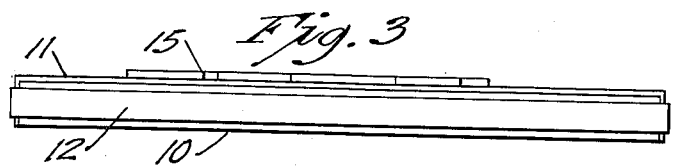
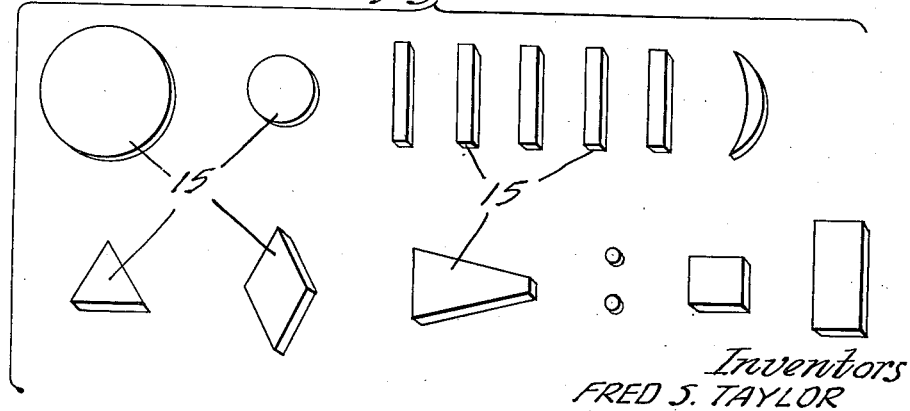
Inventors
FRED S. TAYLOR
RICHARD P. TAYLOR
By Chas. C. Reif
Attorney Patented Apr. 8, 1952

2,592,078

UNITED STATES PATENT OFFICE 2,592,078

EDUCATIONAL FIGURE TOY DEVICE

Richard P. Taylor and Fred S. Taylor, Minneapolis, Minn.

Application March 24, 1948, Serial No. 16,724

1 Claim. (Cl. 46—22)

This invention relates to an educational device, and while the invention might have various applications, it particularly is designed for use by young children.

It is an object of this invention to provide a simple and efficient educational device comprising a member having a flat top surface, a sheet of material overlying said surface and having a coating of non-drying adhesive on its upper side, together with a plurality of figures of different shapes having flat bottoms, said figures being adapted to be placed on and removably held on said sheet by said coating.

It is a further object of the invention to provide an educational toy comprising a board or plate-like member having a flat top surface, a sheet of fabric material overlying said surface, said sheet having a coating of non-drying adhesive on its upper side, means for holding said sheet on said surface, and a plurality of figures of different shapes having flat bottoms and adapted to be removably held on said coating whereby when said figures are removed said sheet will not be pulled away from said surface.

It is another object of the invention to provide such a device as set forth in the preceding paragraph, said means comprising a coating of adhesive on the under side of said sheet.

These and other objects and advantages of the invention will be fully set forth in the following description made in connection with the accompanying drawings in which like reference characters refer to similar parts throughout the several views and in which:

Fig. 1 is a plan view of said device, a portion being broken away;

Fig. 2 is a vertical section taken substantially on line 2—2 of Fig. 1, as indicated by the arrows;

Fig. 3 is an edge view or a view in side elevation of the device; and

Fig. 4 is a composite view showing a plurality of figures used.

Referring to the drawing a device is shown comprising a member 10, said member having a flat top surface. While member 10 could be variously made, in the embodiment of the invention illustrated it is shown as in the form of a plate or board of rectangular form. In practice member 10 has been made substantially square in plan. A sheet of material 11, preferably of suitable fabric, is provided and this sheet overlies the top surface of member 10. Sheet 11 has a width equal to the width of member 10 and preferably is somewhat longer than member 10 in length so that the ends 11a of member 11 extend downwardly along the sides or edges of member 10, as shown in Figs. 2 and 3. Sheet 11 will be secured to member 10 in any suitable manner, and as illustrated, the portions 11a are secured to the sides of member 10 by a suitable adhesive. Preferably a strip of material 12 such as a tape is also provided and extends around the four sides of member 10 and overlies the portions 11a. Strip 12 will have a suitable adhesive thereon so as to adhere to the sides of member 10 and portions 11a. Sheet 11 above the top surface of member 10 is provided on its upper side with a coating 13 of non-drying adhesive. Such adhesives are now well known and can be suitably applied to the surface of member 11. Means are also provided for holding the bottom surface of member 11 to the top surface of member 10, and while various means might be provided, a coating of adhesive 14 is provided on the bottom side of sheet 11 and overlies the top surface of member 10. Sheet 11 is not secured to member 10 with great firmness. A plurality of figures 15 shown in Fig. 4 are provided, which figures will be of different shapes. More than one of certain figures may be provided. Figures 15 have a flat side or flat bottoms.

In using the device the child or other operator will take the pieces 15 and press the bottoms thereof against the coating 13. Said pieces or figures will adhere to coating 13 and various designs can thus be made on sheet 11. The figures can be very easily removed and practically none of the adhesive of coating 13 will be removed therewith. When the pieces are pressed onto coating 13, sheet 11 will be pressed against the top surface of member 10 and will adhere to said surface due to the adhesive 14. When the pieces or figures 15 are removed or pulled off of the coating 13, sheet 11 will thus not be pulled away from the surface of member 10.

From the above description it will be seen that I have provided a simple and yet highly efficient educational device. It has previously been proposed to have a member with a recess therein in which a gelatinous body was disposed. Such a device is rather heavy and cumbersome and the gelatinous body had soon to be replaced. The present device is much simpler, easier to operate and much cleaner than said previous device. Should it be necessary to replace the sheet 11, this can be easily and quickly done at very small expense. There is no mucilage, glue or other adhesive to stick to the children's fingers. The pieces or figures 15 remain clean and the pieces 15 can be very easily and quickly removed.

The device has been amply demonstrated in actual practice, found to be very successful and efficient and is being put into commercial production.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claim.

What is claimed is:

An educational device having in combination, a base member having a flat top surface, a sheet of flexible fabric material overlying all of said surface and secured to said member about the sides of said member, said sheet having a non-drying adhesive coating on its top side, an adhesive coating covering the underside of said sheet to cause the same to adhere to said surface when said sheet is pressed against said surface and a plurality of figures of different shapes having non-adhesive flat bottoms adapted to be placed on said top side and pressed thereagainst so as to removably adhere to said non-drying adhesive coating and cause said sheet to adhere to said flat top surface of said base member whereby when said figures are removed from said sheet said sheet will not be pulled away from said flat top surface of said base member.

RICHARD P. TAYLOR.
FRED S. TAYLOR.

REFERENCES CITED

The following references are of record in the file of this patent:

UNITED STATES PATENTS

| Number | Name | Date |
|---|---|---|
| 1,259,787 | Segall | Mar. 19, 1918 |
| 1,772,697 | Backmyer | Aug. 12, 1930 |
| 1,803,256 | Horn | Apr. 28, 1931 |
| 2,071,912 | Auer | Feb. 23, 1937 |
| 2,460,221 | Gordon | Jan. 25, 1949 |